United States Patent [19]

Chow

[11] Patent Number: 4,721,248

[45] Date of Patent: Jan. 26, 1988

[54] READILY ASSEMBLEABLE OSCILLATING SPRINKLER

[75] Inventor: Ho Chow, Cliffside Park, N.J.

[73] Assignee: Jet Stream, Inc., Wilmington, Del.

[21] Appl. No.: 852,030

[22] Filed: Apr. 14, 1986

[51] Int. Cl.[4] .......................... B05B 3/16; B05B 3/00; B05B 1/00; F16D 1/00

[52] U.S. Cl. .................................... 239/242; 239/264; 239/265; 239/600; 403/71; 403/289; 24/625

[58] Field of Search ......................... 403/71, 289, 290; 24/625; 239/240, 242, 264, 265, 600

[56] References Cited

U.S. PATENT DOCUMENTS

| | | | |
|---|---|---|---|
| 3,430,860 | 3/1969 | Chow | 239/242 |
| 4,204,652 | 5/1980 | Cislak et al. | 403/289 X |
| 4,232,827 | 11/1980 | Roman | 239/242 |
| 4,389,759 | 6/1983 | Yuda | 24/625 X |

FOREIGN PATENT DOCUMENTS

| | | | |
|---|---|---|---|
| 231705 | 11/1959 | Australia | 403/289 |
| 8500304 | 1/1985 | PCT Int'l Appl. | 239/242 |

*Primary Examiner*—Andres Kashnikow
*Assistant Examiner*—Patrick N. Burkhart
*Attorney, Agent, or Firm*—James & Franklin

[57] ABSTRACT

An oscillating sprinkler is specially designed to facilitate assembly, as well as disassembly for purposes of repair of replacement of parts, without sacrifice of water-tight integrity and with improved operating characteristics. The housing for the impulse wheel and for supporting one end of the sprinkler tube is formed of two parts snapped together to effect the necessary seal, the sprinkler tube is mounted therein by a snap action insertion, thereby to define an operating subassembly, and that subassembly is reliably assembled with a mounting subassembly by sliding insertion and snap action retention. The sprinkler tube is sealingly journaled in such a manner as to produce very low friction, thus reducing the load on the impeller wheel and enabling the sprinkler to have a very low pressure drop therethrough, thereby increasing the sprinkling range of the device. The linkage between the impeller wheel and the sprinkler tube is manually accessible and is provided with a snap connection so that the linkage can readily be manually disconnected and connected. The construction lends itself to producing a low-profile, low cost unit.

8 Claims, 13 Drawing Figures

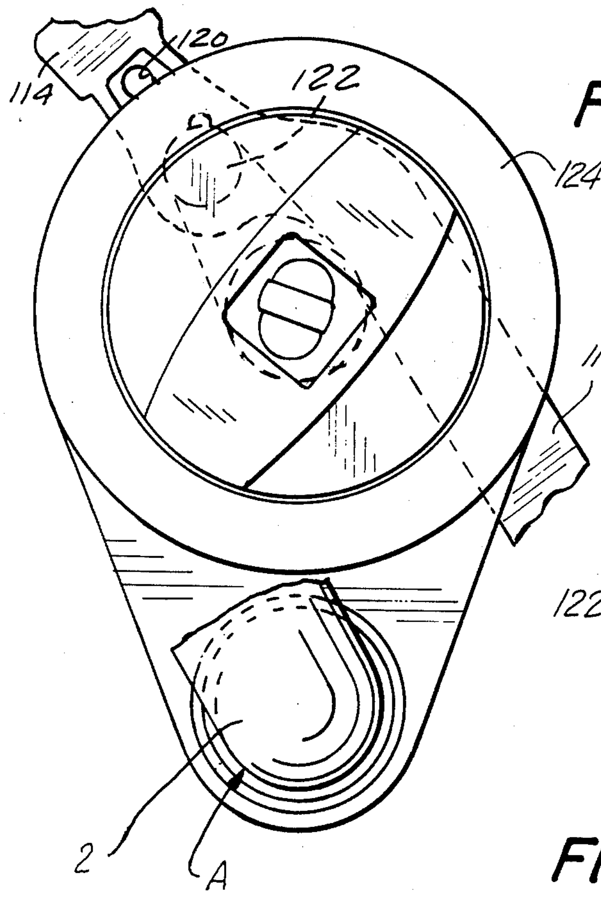
FIG. 7B
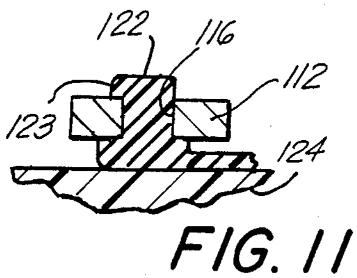
FIG. 11
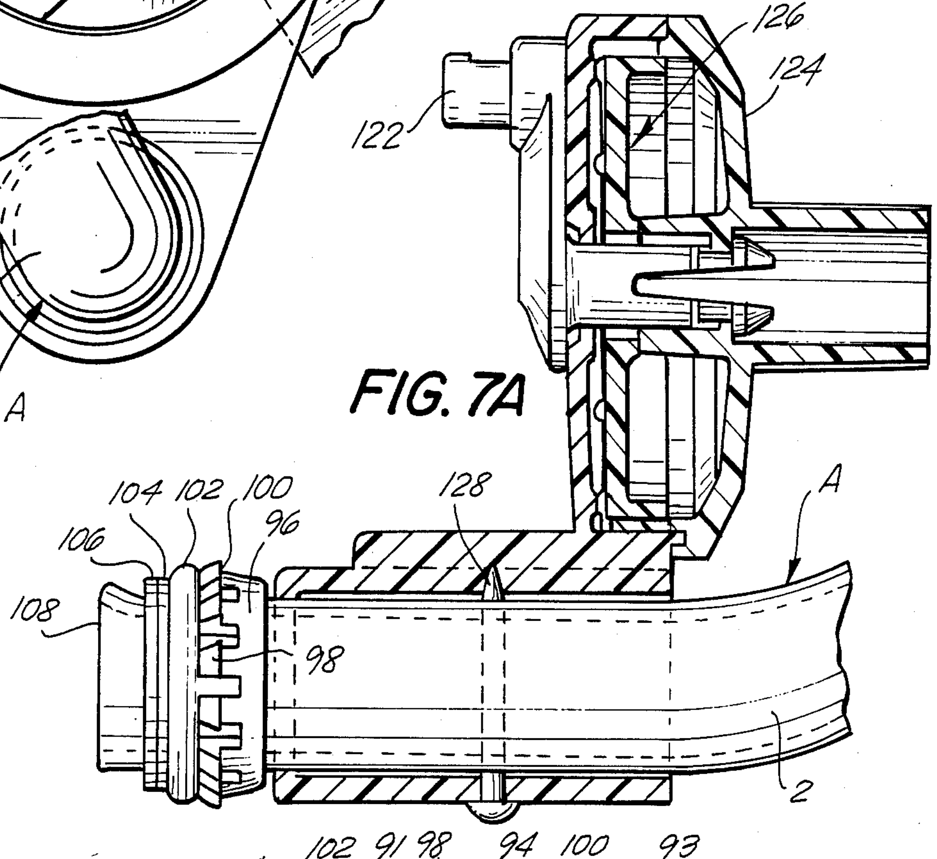
FIG. 7A
FIG. 7C
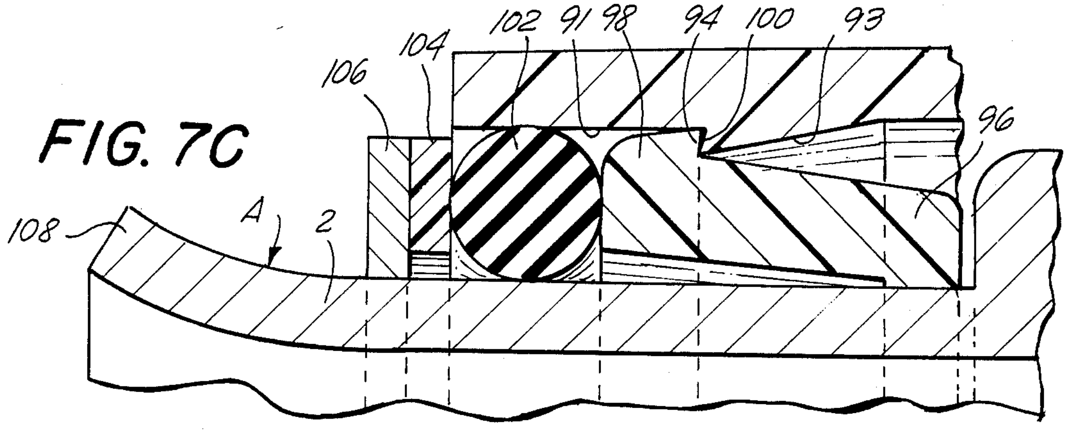

READILY ASSEMBLEABLE OSCILLATING SPRINKLER

The present invention relates to the construction of an oscillating sprinkler so as to facilitate assembly and disassembly, reduce cost, enable the sprinkler to have a low profile, thus increasing acceptability to the consumer, and produce improved operating characteristics.

An oscillating sprinkler is one in which a tube or other part from which a spray of water is adapted to emanate is oscillated back and forth, thereby to sprinkle an appreciable area of ground. The power for causing the tube to oscillate is usually derived from the flow of water through the device, as by turning an impulse wheel which is mechanically connected to the oscillating tube.

The sprinkling element is journaled in the sprinkler housing for oscillatory movement, and when the fluid flow means and impulse wheel are in the housing it must also be in fluid communication with the interior of that housing. Problems have therefore arisen in connection with the mounting of the oscillatory tube and the maintaining of a leak-proof seal between the tube and the housing, which problems are accentuated by the fact that such devices are usually designed for use on home lawns and therefore must be light and inexpensive.

Since fluid must flow through the sprinkler housing, it is essential that the housing be fluid-tight. The housing casing must, in order to facilitate assembly of the operative parts, be formed of a plurality of parts adapted to be assembled together, and consequently some difficulty has been experienced in obtaining, by means of a structure which is readily and inexpensively manufactured, a reliable and long-lasting fluid-tight seal between the housing parts after they are assembled.

The housing, with the sprinkler tube mounted thereon and extending therefrom, is joined with a mounting structure, the latter comprising means for receiving and journaling the extending end of the sprinkler tube and for mounting the housing to which the sprinkler tube is connected.

My U.S. Pat. No. 3,430,860 of Mar. 4, 1969, entitled "Oscillating Sprinkler", discloses one attempt to solve these assembly and operation problems. It involved the making of the impeller wheel housing of two parts which were assembled merely by pushing them together, but the assembly of the other parts was not so simply accomplished, and the construction of the impeller wheel housing parts was sufficiently complex as to involve a certain degree of expense and trouble in making them. The construction was such that the housing when mounted extended up from the ground an appreciable distance, a factor which has come to be displeasing to a substantial part of the purchasing public. In addition, in the construction shown in that patent, and in the commercial progeny of that construction which heretofore have been marketed by the assignee of that patent, the operating characteristics, and particularly the friction that had to be overcome to oscillate the sprinkler tube, required that the impulse wheel work hard, this resulted in an appreciable fluid pressure drop between the fluid inlet to the sprinkler and the fluid outlet therefrom, and thus the force of the water emanating from the sprinkler tube was reduced, lessening the area that a given sprinkler could cover.

It is the prime object of the present invention to devise an oscillating sprinkler structure the parts of which can be inexpensively manufactured, put together for purposes of assembly or taken apart for purposes of repair or replacement in an exceptionally simple manner without sacrificing, and indeed while at the same time enhancing, the operating characteristics of the device.

To that end the two parts of the housing for the impulse wheel, which also mounts the sprinkler tube, are sealingly assembled merely by being pressed together, as is broadly disclosed in U.S. Pat. No. 3,430,860, but by means of more reliable and simpler structure than was there disclosed. The sprinkler tube is mounted on that housing simply by being inserted thereinto and is there retained by snap action and by a structure which greatly reduces friction when the tube is oscillated. The interior of the housing facilitates assembly and mounting of the impulse wheel and associated gearing. Because of that lessened friction, less of the available fluid need be used to drive the impulse wheel, thus giving rise to a reduction in the pressure drop through the sprinkler and a consequent increase in the distance that fluid can be thrown by the sprinkler tube. The housing and the sprinkler tube define an operative subassembly which is assembled with a mounting subassembly simply by being slid into position, there to be releasably retained by snap action, the structure associated with the mounting facilitating the optional use of an additional weight element where that is desired. The improved structure can be contained in a space taking up very little vertical height, thus resulting in a sprinkler exhibiting a low profile, a factor which enhances its salability. The linkage between the impulse wheel and the sprinkler tube, which serves to oscillate the latter, is accessible from the exterior of the housing and includes a special snap-action connection between two of the linkage parts, which facilitates assembly and enables the linkage to be interrupted at will for repair or adjustment or for non-oscillatory use of the sprinkler tube. As a collective result of these factors manufacturing cost both with regard to fabrication of parts and especially with regard to assembly of parts is significantly decreased, while the operating characteristics of the sprinkler are not sacrificed and in significant respects are enhanced.

To the accomplishment of the above, and to such other objects as may hereinafter appear, the present invention relates to the construction of an oscillatory sprinkler as defined in the appended claims and as described in this specification, taken together with the accompanying drawings in which:

FIG. 7A is a detail cross-sectional view of the end of the sprinkler tube adapted to be inserted into the housing and with part of the actuating mechanism therefor attached;

FIG. 7B is an end elevational view taken from the right-hand side of FIG. 7A;

FIG. 7C is a cross-sectional view on an enlarged scale of the sprinkler tube when received in the housing;

FIG. 11 is a detail cross-sectional view showing the snap action in the external linkage between the impeller wheel and the oscillator tube.

Figure 1:
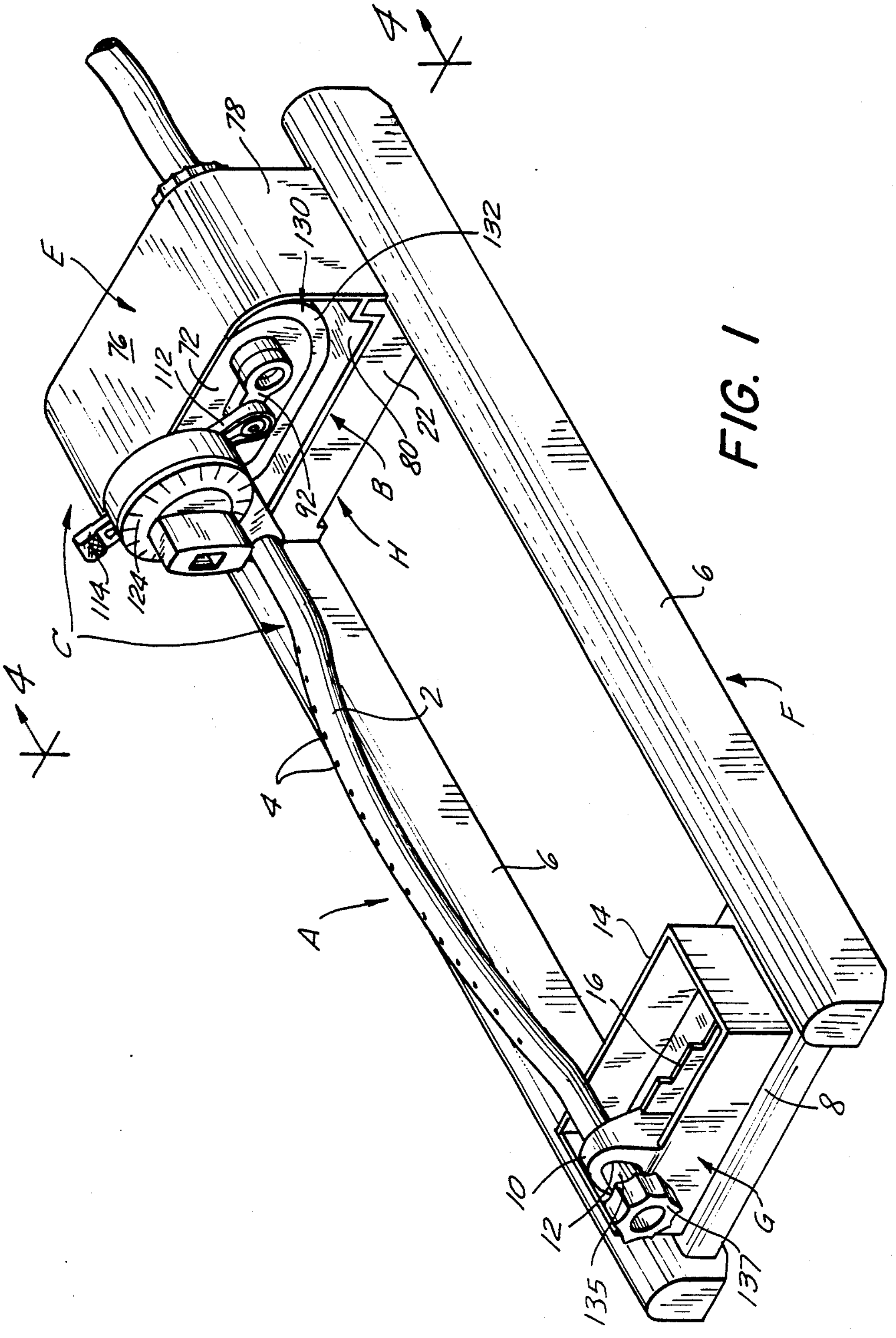
FIG. 1 is a three-quarters perspective view of the assembled sprinkler.

As is conventional, the oscillating sprinkler of the present invention comprises an oscillatory element A, here shown in the form of a tube 2 having a plurality of sprinkling apertures 4 formed therein. As here disclosed that tube is mounted on a housing B to define an operating subassembly C, the housing B in turn being formed of first and second cooperating sections generally designated D and E respectively. The operating subassembly C is designed to be assembled with a mounting subassembly generally designated F, that mounting subassembly comprising first and second mounting parts G and H respectively, the part G receiving and providing pivotal support for the free end of the sprinkler tube A while the part H is adapted to receive and retain the housing B. The operating subassembly C and the mounting subassembly F are designed to be assembled simply by sliding them together.

To describe the mounting subassembly F in greater detail, the first and second mounting parts G and H may be connected by spacing, and preferably ground-engaging, structures such as the conventional runners 6. Those runners 6 are connected at their left-hand ends by a plate 8 from which a post 10 with a horizontal aperture 12 extends upwardly. As here disclosed that post 10 extends up from an open-topped box-like structure 14 having a stepped partition 16 therein to function as a measuring device for the amount of water sprayed. The right-hand ends of the runners 6 are connected by a structure generally designated 18 having an outer vertical wall 20 and an inner vertical wall 22 between which a floor 24 extends. At either side of the floor 24, and extending up therefrom, is structure defining slots 26 closed at their left-hand end (as viewed in FIG. 2) and open at their right-hand end, the slots 26 being located above the upper edge of the outer wall 20. The outer wall 20 is provided with an upwardly extending lug portion 28 and the floor 24 may, if desired, be provided with small upwardly extending lugs 30.

Figure 3:
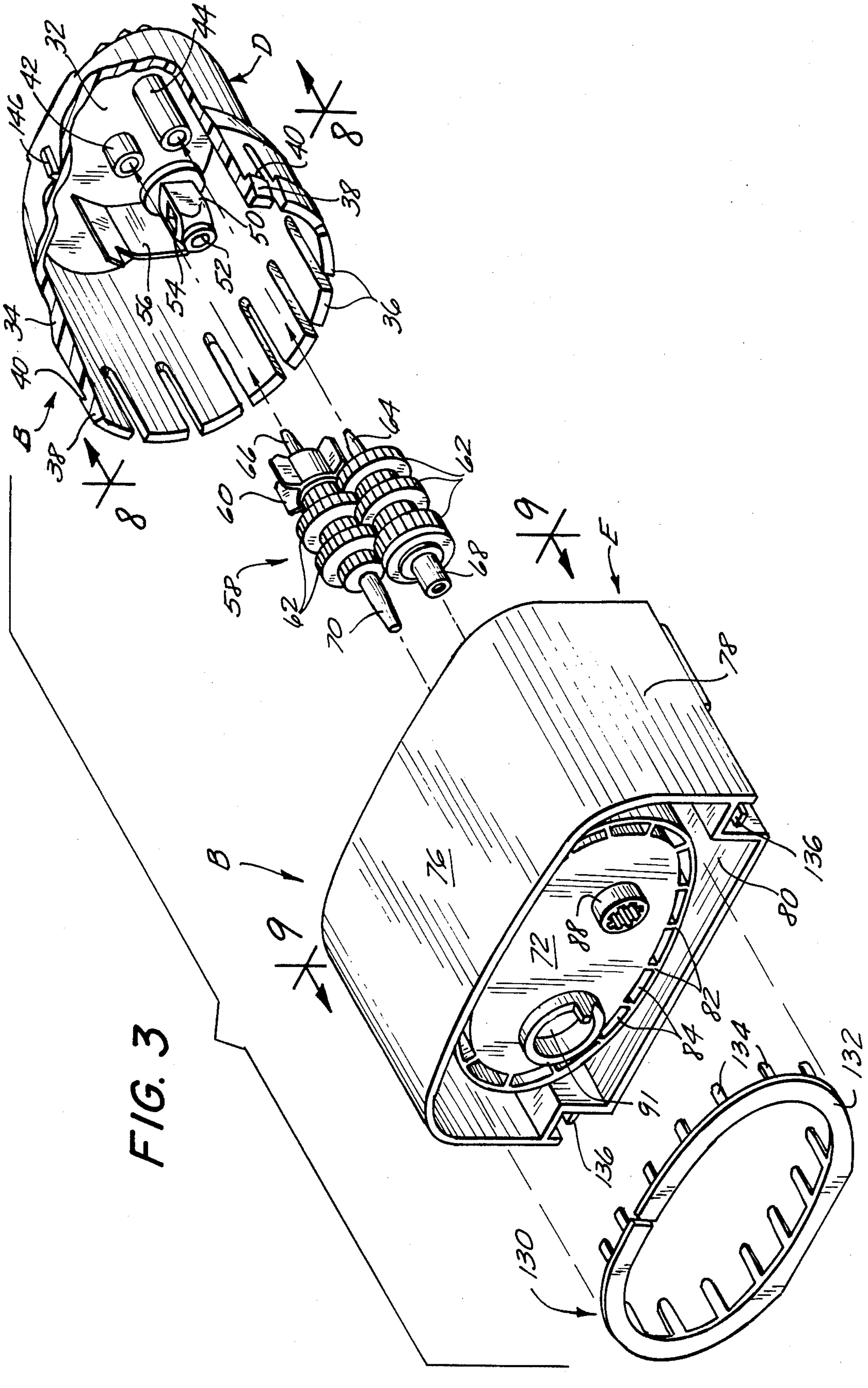
FIG. 3 is an exploded three-quarter perspective view of the parts making up the housing for the impeller wheel.

The housing B is perhaps best illustrated in FIG. 3. It is formed of sections D and E, each preferably made of molded plastic material. The first housing section D is essentially of cup shape and of elliptical cross-section and has an end wall 32 and a side wall 34 which extends up therefrom and which terminates in spaced resilient fingers 36 having rearwardly and outwardly inclined outer surfaces 38 terminating in recessed rearwardly facing ledges 40. Extending up from the end wall 32 inside the side wall 34 are a pair of open-ended tubes 42 and 44. Passing through the end wall 32 is an aperture 46 defining the fluid inlet opening to the housing section D and communicating at the exterior of the housing with a conventional hose coupling 48. Interiorly of the housing section D that opening 46 communicates with a conduit 50 the end of which is provided with an aperture 52 and the side of which is provided with an aperture 54. The relative sizes of the apertures 52 and 54 are preferably such that about half of the total water flow passes through each aperture. Extending laterally from the conduit 50 is a shaped baffle 56. The second housing section E includes an essentially cup-shaped portion having end wall 72 and side wall 74 extending up therefrom, that portion being of similar cross-section to that of first housing section D. That cup-shaped portion is surrounded by a shell defined by a top wall 76, side wall 78 and a bottom wall 80, all at least partially suitably spaced from the side wall 74 and connected thereto in any appropriate manner, as by means of the ribs 82 defining spaces 84 therebetween with radially inwardly and axially outwardly inclined surfaces 83 formed on the radially outer surfaces of those spaces 84, and terminating in axially outwardly facing ledges 85. The width of the spaces 84 is at least equal to the width of the fingers 36 extending from the housing section D and the height of the spaces 84 is such as to permit those fingers 36 to pass through the spaces, to be cammed radially inwardly by the interaction of the inclined surfaces 38 and 83 and then to have the finger ledges 40 snap over the housing ledges 85, thereby to retain the two sections D and E assembled together.

A gear cluster generally designated 58, comprising an impulse wheel 60 and a plurality of separate but meshingly interconnected gears 62 arranged seriatim in two meshing sets with extending lower shaft portions 64 and 66, is adapted to be first inserted into and carried by the second housing section E, the upper shaft portion 70 fitting within a tube 86 extending inwardly from the end of wall 72 and the upper shaft portion 68 extending up from the last gear 62 in the gear cluster 58 and entering an aperture 88 in the end wall 72 so as to be rotatable therein. Posts 61 extending up from the end wall 72 support the gear cluster 58 in its properly located position in the second housing section E.

When the housing sections D and E are assembled, the lower shaft portions 64 and 66 thereof fit within the tubes 42 and 44 respectively on the first housing section D. When the gear cluster 58 is thus positioned the impulse wheel 60 will be located opposite the side opening 54 on the conduit 50. The baffle 56 is located so as to extend from the side conduit opening 54 partially around the impulse wheel 60, thereby to serve as a guide directing fluid flow from the conduit opening 54 against the impulse wheel 60 so as to drive the latter in rotation.

The shaft section 68 is the output shaft of the gear cluster 58, is driven in rotation by the impulse wheel 60, as is conventional, and is rotatably secured in any appropriate manner, as by screw 90, to a crank arm 92 mounted on the exterior of the housing section D so as to drive that crank arm 92 in rotation.

Figure 5:
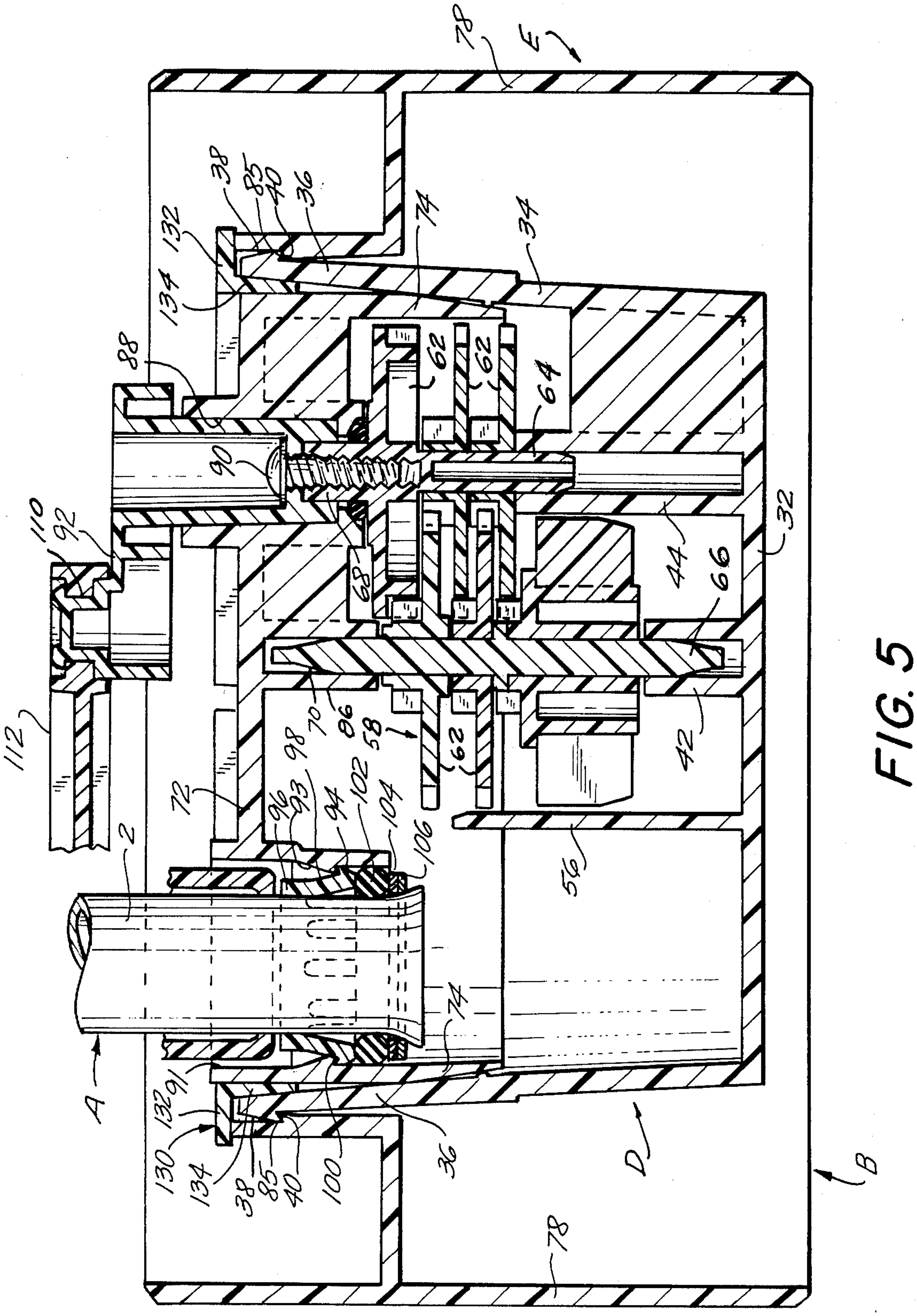
FIG. 5 is a cross-sectional view taken along the line 5—5 of FIG. 4.
Figure 6:
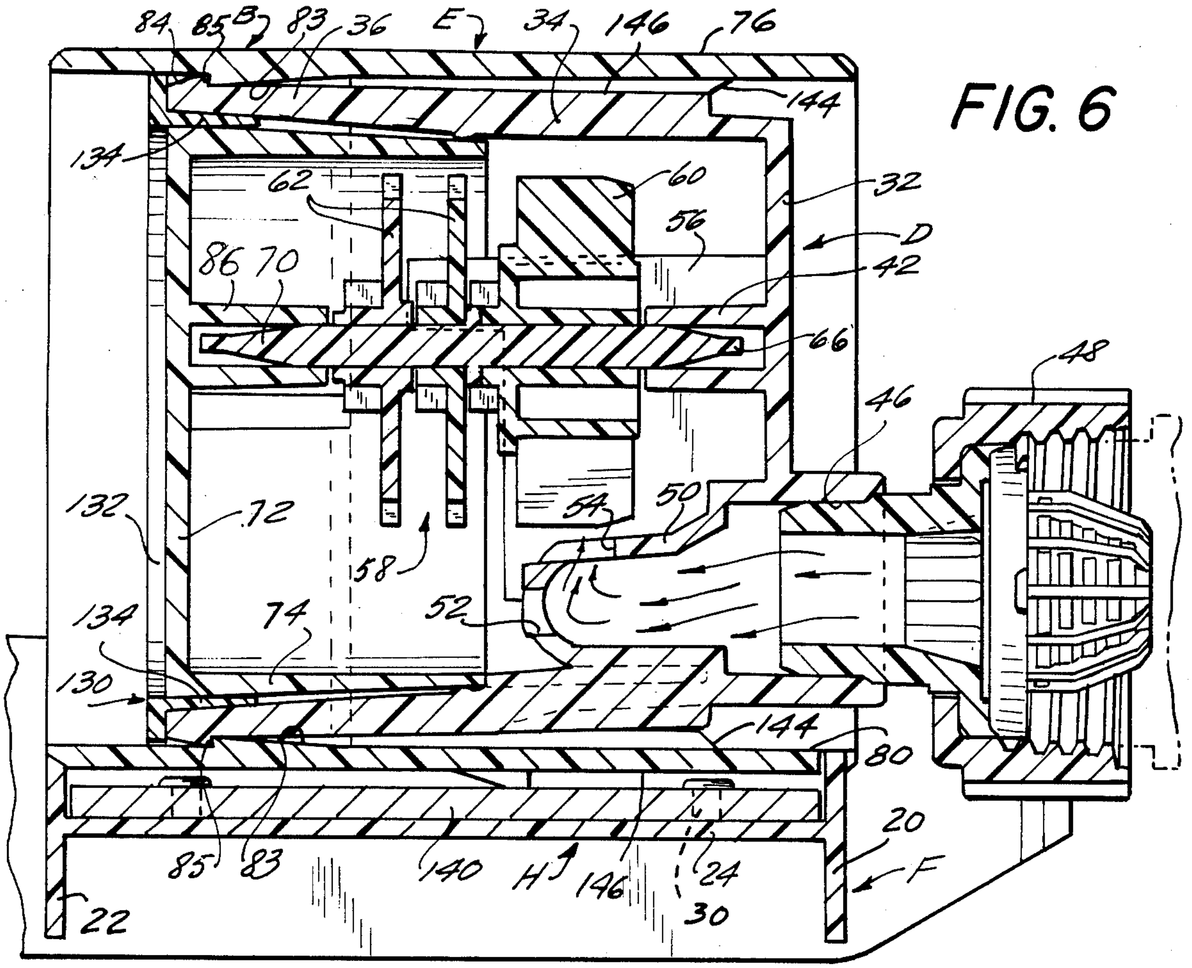
FIG. 6 is a cross-sectional view taken along the line 6—6 of FIG. 4.
Figure 10:
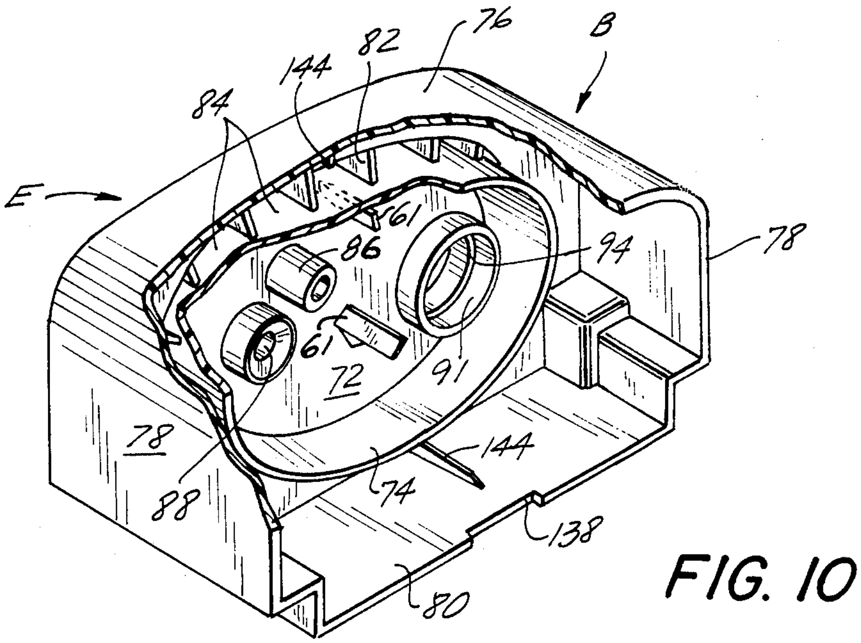
FIG. 10 is a partially broken away, three-quarter perspective view of the left-hand housing section of FIG. 3.
Figure 8:
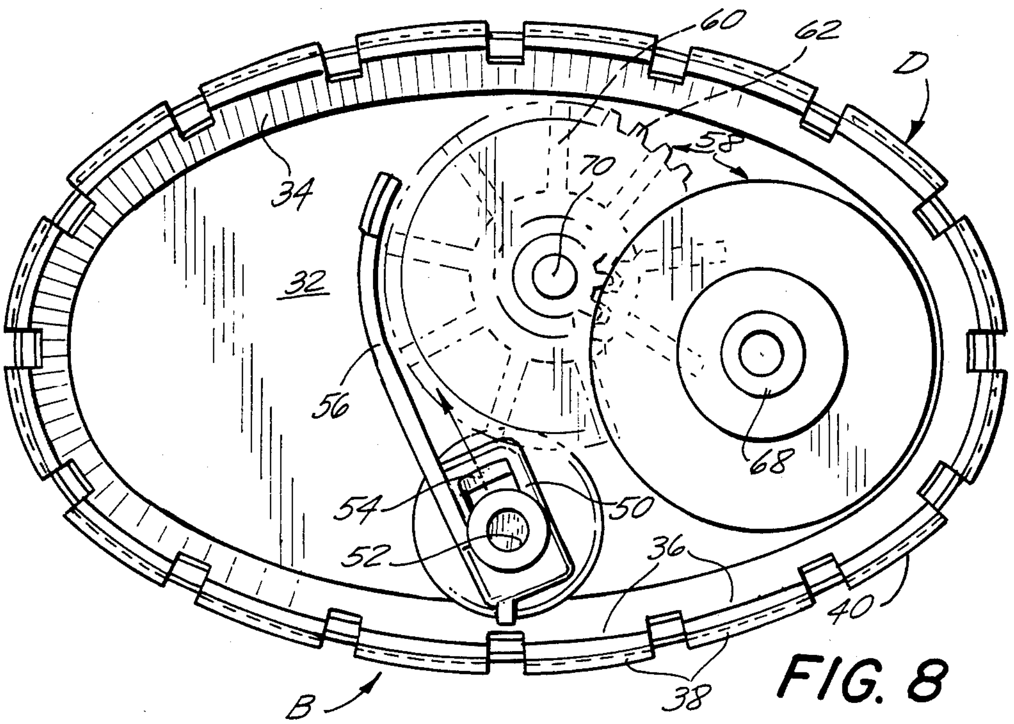
FIG. 8 is an end elevational view of the right-hand housing section shown in FIG. 3 with the gear cluster assembly therein.
Figure 9:
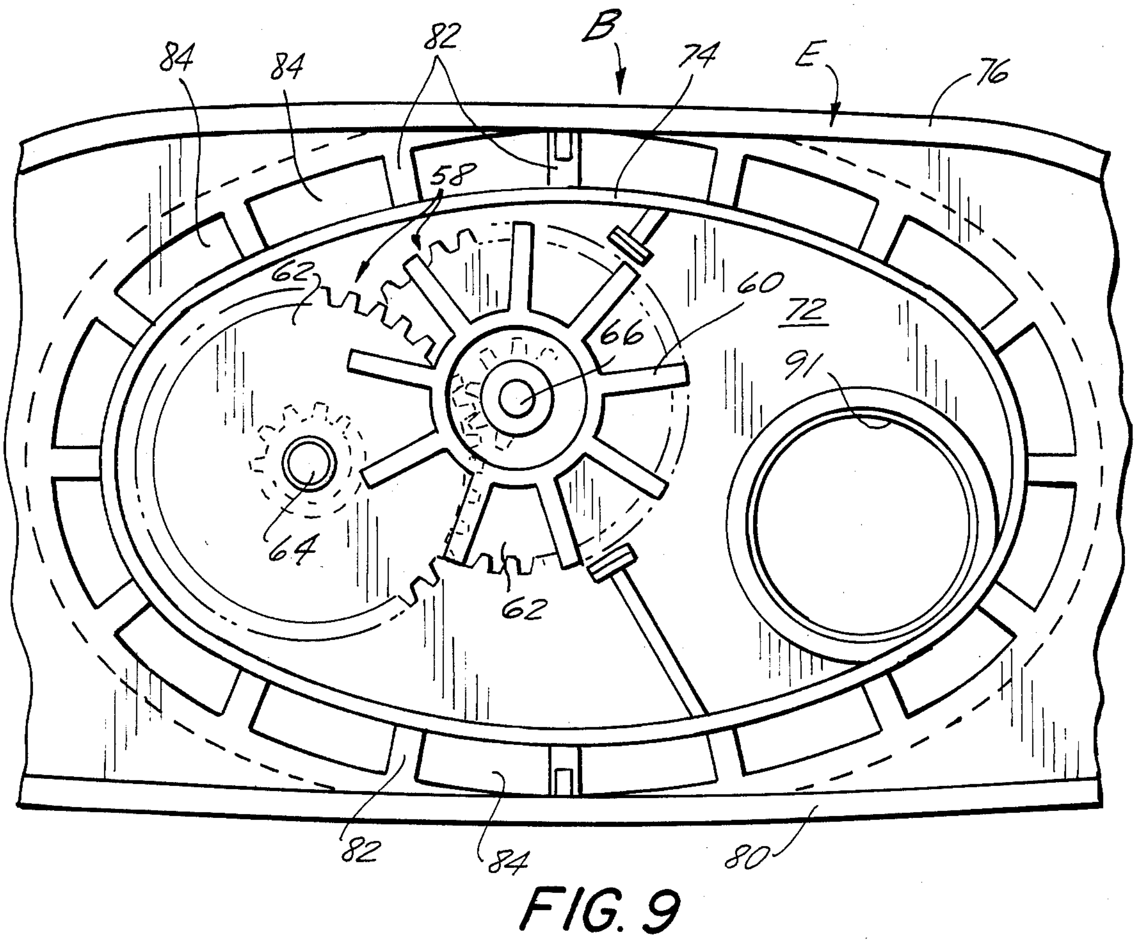
FIG. 9 is an end elevational view of the left-hand housing section shown in FIG. 3 taken along the line 9—9 of FIG. 3 and showing the position which the gear cluster assumes therein when the housing sections are assembled.

As may best be seen from FIGS. 5 and 6, the inner surface of the side wall 34 of the housing section D and the outer surface of the side wall 74 of the housing section E, when those two sections are pressed together, are so cooperatively sized and shaped as to sealingly engage one another and hence provide a fluid-tight seal of appreciable axial extent for the interior of the housing B.

As has been noted, when the housing sections D and E are assembled the side wall 34 of the section D is spaced from the walls 76 and 80 of the shell forming a part of the housing section B. The walls 76 and 80 are of appreciable width and therefore they may tend to collapse inwardly. In order to provide additional support for the walls 76 and 80 they may be provided on their radially inner surfaces with inwardly extending ribs 144 which register and engage with ribs 146 on the exterior of the side wall 34 of the housing section D.

The end wall 72 of the housing section E is provided with a second aperture 91 designed to rotatively receive the sprinkler tube A. That aperture 91 is defined by a cylindrical wall of appreciable depth the inner surface of which is provided with a radially inwardly inclined portion 93 terminating in ledge 94. The sprinkler tube A is provided, at its end adapted to be mounted on the housing B, with a plastic ring 96 having radially outwardly extending resilient fingers 98 with rearwardly facing ledges 100, with an O-ring 102 for sealing purposes, and with second and third rings 104 and 106. The plastic ring 96 is formed of a low coefficient of friction material such as acetal resin such as is sold under the tradename Delrin. The ring 106 is essentially fast on, and therefore rotates with, the tube A, and may be made of metal such as stainless steel, while the ring 104 preferably does not radially engage the tube A but is designed to be axially interposed between, and axially engage, both the O-ring 102 and the third ring 106. The ring 104 is formed of some material with a low coefficient of friction, such as an ultra high molecular weight polyethylene. The open end of the tube A is flared, at 108, in order to retain the rings 102, 104 and 106 thereon. With this construction the tube A can be mounted on the housing B simply by sliding its flared end 108 axially through the housing aperture 91 until the spring fingers 98 snap into place behind the ledges 94. The O-ring 102 will then radially engage both the tube A and the inner surface of aperture 91 to produce a seal. As the tube A is oscillated it rotates with respect to the ring 96 and the O-ring 102, the ring 106 rotates with it, and because of the low coefficient of friction of the ring 104 the frictional resistance to that rotation is greatly minimized.

Figure 4:
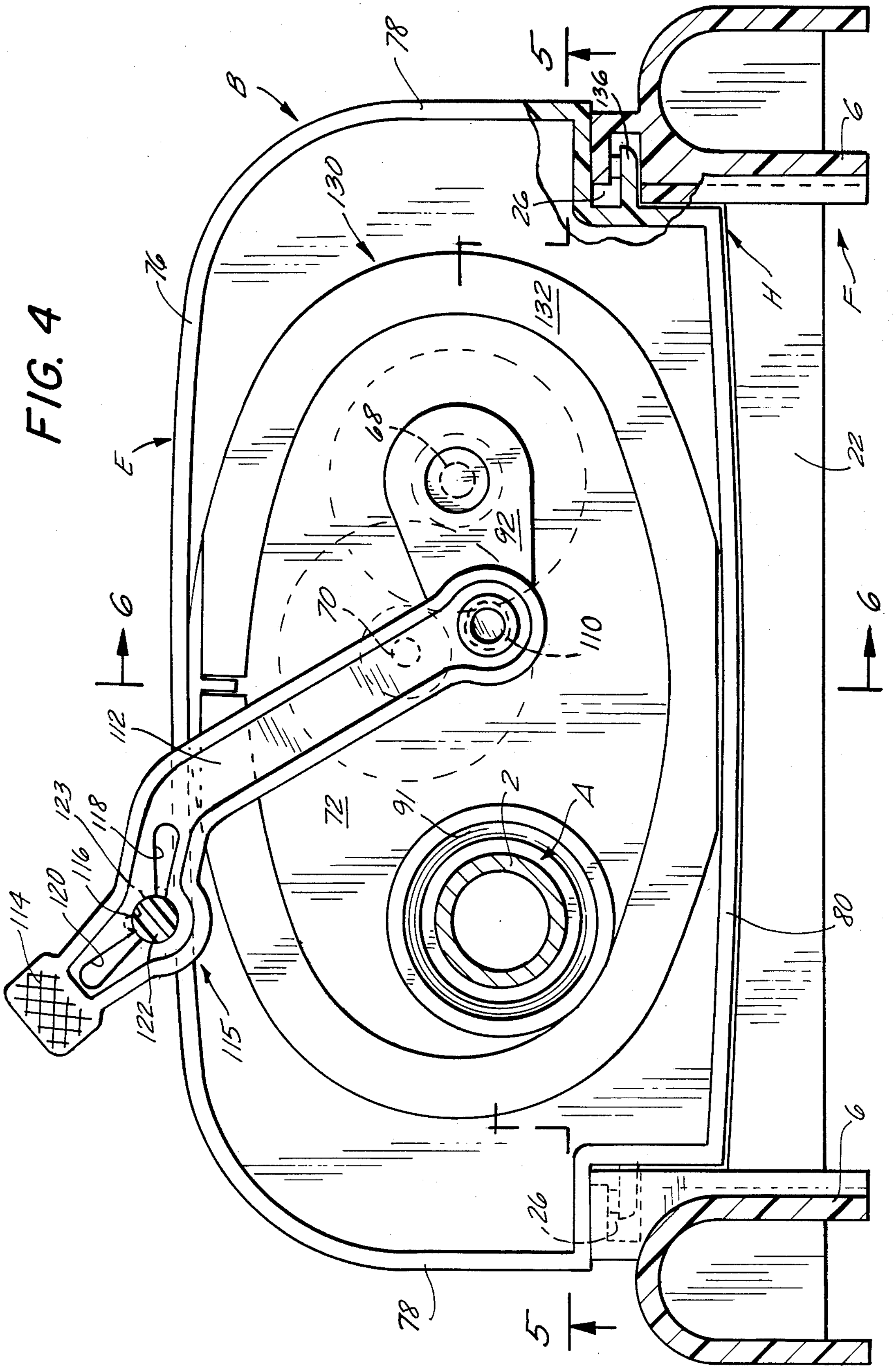
FIG. 4 is a cross-sectional view, partially broken away, taken along the line 4—4 of FIG. 1.

Externally of the housing B the crank arm 92, driven by the impulse wheel 60, is pivotally connected at 110 to an arm 112 (see FIG. 4) which adjacent its end is provided with a manual grasping portion 114 and a slotted portion 115 comprising, as here specifically disclosed, a central slot 116 and two communicating side slots 118 and 120. The slotted portion 115 is, because of the material of which the arm 112 is formed and the presence of the slot 116, as well as slots 118 and 120 when provided, resiliently laterally expandable. It is designed to be pushed over the end of a shaft 122 on a subsequent part 124 of the linkage connecting the crank arm 92 to the oscillating tube A and to snap past a radial projection 123 at the end of that shaft 122, that projection 123 inhibiting axial movement of the arm 112, thereby to retain the arm 112 on the shaft 122, which provides a pivotal driving connection between the arm 112 and the part 124. That part 124 carries throw-adjusting means 126 of known construction and forming no part of the present invention and is positively connected to the sprinkler tube A, as by being rotatively fixed to that tube by means of the nail 128. Because of the snap-action cooperation between the slotted portion of the arm 112 and the shaft 122, the linkage, and hence the driving connection between the crank arm 92 and the sprinkler tube A, can be made or broken manually merely by grasping the part 114 and moving the extending end of the arm appropriately. This is valuable in facilitating assembly and disassembly (the arm 112 is mounted on the housing B, the part 124 is mounted on the tube A, they are moved next to one another when the tube A is snap-inserted into the housing aperture 91, and they are then operatively associated when the arm 112 is snapped onto the shaft 122 on the part 124), and also enables the user of the device to disconnect the sprinkler tube A from the impulse wheel when non-oscillatory sprinkling is desired.

It has been previously observed that the height of the openings 84 on the housing section E into which the fingers 36 of the housing section D are received must permit those fingers 36 to move radially as the housing sections D and E are assembled. If disassembly is desired, insertion of an appropriate tool through the exposed ends of the openings 84 to push on surfaces 38 will cause manual radial movement of the fingers 36 to disengage them from the ledges, thereby permitting separation of the housing sections D and E. Normally the resiliency of the fingers 36 is sufficiently strong so that such disengagement will not occur without the action of that tool, but sometimes the material of which the housing section D is formed is sufficiently weak so that its inherent resiliency cannot be relied upon. Under those circumstances it is desirable to use a locking element 130, that element having a ring-like structure 132 from which relatively thin fingers 134 depend, those fingers 134 being so sized and arranged as to enter the spaces 84 radially inside the fingers 36 when the housing sections D and E have been assembled, preventing the fingers 36 from moving inwardly and thus positively preventing separation of the housing sections D and E until such time as the locking element 130 is removed.

Figure 2:
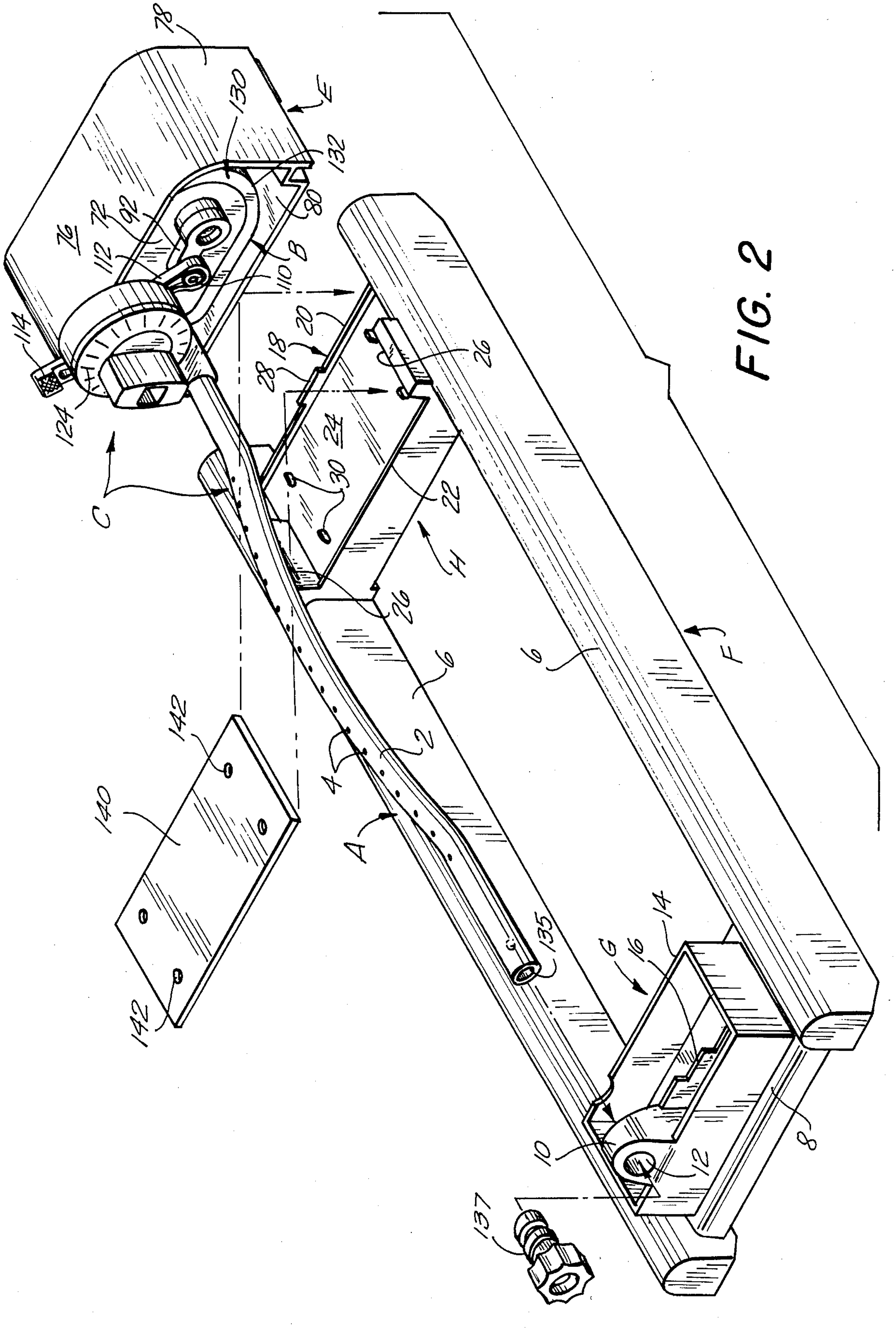
FIG. 2 is a view similar to FIG. 1 but showing the major subassemblies and the optional weight in exploded fashion.

The operating subassembly C, comprising the sprinkler tube A, the housing B, and the linkage 92, 112, 124 for oscillating the tube A, is assembled with the mounting subassembly F simply by sliding it from left to right as viewed in FIG. 2, the free open end 135 of the sprinkler tube A passing through the aperture 12. That open tube end 135 is then blocked by plug 137, which may be screwed into that open tube end, as is conventional. The housing section E is provided at each side with a flange 136 which is slid into the slots 26 formed at the sides of the mounting part H of the mounting subassembly F, thus mounting the housing B on the mounting part H. When the housing B has been pushed fully home, as determined by the stop-cooperation of the flanges 136 and the slots 26, the upstanding lug 28 on the front wall 20 of the mounting part H will snap into a recess 138 on the bottom wall 80 of the housing shell, thereby releasably retaining the housing B in its desired position.

When the subassemblies C and F have been assembled the bottom wall 80 of the housing shell and the floor 24 of the mounting part H as here disclosed are vertically spaced from one another, and a weight member 140, such as an appropriately dimensioned metal plate, may be inserted in that space if desired. The weight member 140 may be provided with apertures 142 through which the small lugs 30 are adapted to extend and, if desired, those lugs 30 may be upset over the upper surface of the weight member 140 in order to hold the latter securely in place.

It will be appreciated from the above that the parts which make up the sprinkler are simple and easily and reliably formed, and that in particular the manner in which the seal between the housing sections D and E is effected is considerably structurally simpler, and therefore much more readily manufacturable, than the housing structure of my previous U.S. Pat. No. 3,430,860. The final assembly of the sprinkler by sliding the operating subassembly C onto the mounting subassembly F, and the formation of the operating subassembly C by sliding the housing sections D and E into sealing engagement, as well as the mounting of the tube A on the housing B and the completion of the linkage for driving the tube A in oscillation, are all accomplished through simple snap-action operations, thus maximizing the simplicity of the assembly of the sprinkler. Further facilitation of assembly is accomplished by appropriately supporting and locating the gear cluster 58 in the second housing section E, so that that grouping of parts can be reliably moved to the first housing section D with the gear cluster in proper position for mating with the cooperating support structure on the first housing section D. The structure by means of which the sprinkler tube A is sealingly and rotatably mounted on the housing B not only simplifies assembly but also journals the tube A in such a manner as to minimize friction, thus reducing wear and increasing the sprinkling range of the unit.

All of the parts may be very readily manufactured and need not be made to any high degree of precision. The structure is such that a unit of attractive low profile results. Hence a clean and uncluttered-looking lawn sprinkler of pleasing appearance may be produced at a truly minimal cost without sacrifice of, and in many respects with enhancement of, the functional attributes of the device.

While but a single embodiment of the present invention has been here specifically disclosed, it will be apparent that many variations may be made therein, all within the scope of the invention as defined in the following claims.

I claim:

1. In an oscillating sprinkler, a housing on which a sprinkler tube is adapted to be mounted and within which driving means for said sprinkler tube is received, said housing comprising a first section having an end wall for carrying said tube and an output member driven by said driving means and having a side wall, water input means for said sprinkler, said housing comprising a second section having an end wall for carrying said water input means and having a side wall sealingly engaging said side wall of said first section, one of said sections carrying projecting spring fingers and the other of said sections having openings into which said spring fingers are adapted to be received, said spring fingers then resiliently engaging said one section for inhibiting separation of said sections after said sections have been assembled.

2. In an oscillating sprinkler, a housing on which a sprinkler tube is adapted to be mounted and within which driving means for said sprinkler tube is received, said housing comprising a first section having an end wall for carrying said tube and an output member driven by said driving means and having a side wall enclosing an essentially horizontally elliptical cavity, water input means for said sprinkler, said housing comprising a second section having an end wall for carrying said water input means and having a side wall sealingly engaging said side wall of said first section, one of said sections carrying projecting spring fingers and the other of said sections having openings into which said spring fingers are adapted to be received, said spring fingers then resiliently engaging said one section for inhibiting separation of said sections after said sections have been assembled.

3. The oscillating sprinkler of claim 1, in which said one section openings are located radially outside said side wall.

4. The oscillating sprinkler of claim 1, in which said one section openings are located radially outside said side wall and said spring fingers extend axially from said side wall of said other section.

5. The oscillating sprinkler of any one of claim 1–4, in which said spring fingers are movable radially in the course of their engagement with one said section, said openings in said other section being radially larger than said spring fingers to permit such movement, and a locking ring having fingers projecting therefrom, said locking ring fingers being so sized and located as to enter said openings in a position to be radially spaced with respect to said spring fingers when said housing parts are assembled, thereby preventing disengagement of said housing sections.

6. The oscillating sprinkler of any one of claims 1–4, in which one of said sections comprises an outer wall extending over but radially spaced from its side wall and from the side wall of the other of said sections when said sections are assembled, thereby to define an at least partially annular space between itself and said side walls.

7. The oscillating sprinkler of any one of claims 1–4, in which one of said sections comprises an outer wall extending over but radially spaced from its side wall and from the side wall of the other of said sections when said sections are assembled, thereby to define an at least partially annular space between itself and said side walls, said outer wall and said other of said sections, at one or more points where they are spaced from one another, carrying opposed and engaging portions, thereby to prevent said outer wall from collapsing toward the other of said sections.

8. An oscillating sprinker assembly comprising:

(1) a mounting subassembly comprising first and second mounting parts separated by connecting means, said first part comprising a post with an aperture therethrough, said second part comprising a housing-receiving structure, and (2) an operating subassembly comprising a housing from which a sprinkler tube extends in a given direction, said tube being of a size to fit into the said aperture in said post, (3) said second part of said mounting subassembly comprising means for slidably receiving said housing when said housing is moved substantially in said given direction and means for engaging said housing and retaining it in its slidable position when said sprinkler tube has been received in said aperture, whereby said tube subassemblies can be readily assembled to produce said oscillating sprinkler assembly;

driving means for said sprinkler tube received within said operating subassembly housing, said housing comprising a first section having an end wall carrying a sprinkler tube mounting structure and an output member driven by said driving means, and having a side wall, water input means for said sprinkler, said housing comprising a second section having an end wall for carrying said water input means, and having a side wall sealingly engaging said side wall of said first section, one of said sections carrying projecting spring fingers and the other of said sections having openings into which said spring fingers are adapted to be received, said spring fingers then resiliently engaging said one section for inhibiting separation of said sections after said sections have been assembled, a sprinkler tube mounting structure defining an aperture radially larger than said tube, and cooperating means on said tube and said mounting structure for snap-engaging when said tube is slid into said aperture, thereby to retain said tube on said housing, said driving means for said sprinkler tube comprising members extending up from an end wall of one of said housing sections, a gear cluster assembly comprising a plurality of shaft portions respectively freely rotatably received on aid members by being moved into engagement therewith, thereby to operatively support said gear cluster assembly in said one of said housing sections, and steadying means extending up from said end wall alongside but normally out of engagement with said gear cluster assembly, thereby to retain said gear cluster assembly in position until said one of said housing sections is assembled with the other of said housing sections;

said driving means output member being accessible from the exterior of said housing, said housing comprising means for guiding water through said driving means to actuate it and for guiding water into said sprinkler tube for sprinkling purposes, and linkage means external of said housing between said output member and said sprinkler tube for driving the latter in response to movement of the former, said linkage means comprising two exposed parts and means engaging said parts with one another by a readily manually disengageable snap engagement, whereby the driving connection between said output member and said sprinkler tube may be manually interrupted and established.

* * * * *